US009781683B2

(12) United States Patent
Nadakuduti et al.

(10) Patent No.: US 9,781,683 B2
(45) Date of Patent: Oct. 3, 2017

(54) DETERMINING TRANSMIT POWER LIMITS USING A COMBINED SPECIFIC ABSORPTION MEASUREMENT FOR MULTIPLE TRANSMITTERS

(71) Applicant: QUALCOMM Incorporated, San Diego, CA (US)

(72) Inventors: Jagadish Nadakuduti, La Jolla, CA (US); Lin Lu, San Diego, CA (US); Paul Guckian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 42 days.

(21) Appl. No.: 14/572,214

(22) Filed: Dec. 16, 2014

(65) Prior Publication Data

US 2016/0174162 A1 Jun. 16, 2016

(51) Int. Cl.
*H04W 52/18* (2009.01)
*H04W 24/02* (2009.01)
(Continued)

(52) U.S. Cl.
CPC .......... *H04W 52/18* (2013.01); *H04B 1/3838* (2013.01); *H04B 17/102* (2015.01); *H04W 24/02* (2013.01); *H04W 52/367* (2013.01)

(58) Field of Classification Search
CPC ..... H04W 24/04; H04W 24/02; H04W 52/18; H04W 52/367; H04B 1/3838; H04B 17/102
(Continued)

(56) References Cited

U.S. PATENT DOCUMENTS 7,683,632 B2 3/2010 Kiminami et al.
8,624,773 B2 * 1/2014 Nguyen .............. G01S 13/9035
342/179
(Continued)

OTHER PUBLICATIONS

"Faster Determination of Mass-Averaged SAR from 2-D Area Scans", Kanda et al., IEEE Transactions on Microwave Theory and Techniques, vol. 52, No. 8, Aug. 2004.*
(Continued)

*Primary Examiner* — Raymond Dean
(74) *Attorney, Agent, or Firm* — Loza & Loza, LLP/Qualcomm

(57) ABSTRACT

A method and apparatus for determining transmit power limits for multiple transmitter devices is provided. The method begins when a two-dimensional area scan and a localized three-dimensional volume scan are performed for each transmitter and antenna. These two-dimensional area scans are converted to a three-dimensional full volume data using analytical estimations to determine the peak averaged SAR value, and subsequently determining the error associated with the analytical estimation. The error associated with the analytical estimation is determined by comparison with the measured value. The combined peak averaged SAR may then be determined for simultaneous transmissions of multiple transmitters with varying transmit powers by combining the scaled and analytically determined three-dimensional full volume data for each transmitter. The value is then further scaled by the worst-case conversion error for all active transmitters. This value is compared with the SAR limit and the maximum allowable transmit power determined for the multiple transmitters.

19 Claims, 6 Drawing Sheets

(51) Int. Cl.
 *H04B 1/3827* (2015.01)
 *H04W 52/36* (2009.01)
 *H04B 17/10* (2015.01)

(58) Field of Classification Search
 USPC .............................................. 455/67.11, 522
 See application file for complete search history.

(56) References Cited

U.S. PATENT DOCUMENTS

| | | | |
|---|---|---|---|
| 2007/0111681 A1 | 5/2007 | Alberth, Jr. et al. | |
| 2010/0176949 A1* | 7/2010 | Emigh | B60R 25/1004 340/572.1 |
| 2011/0205544 A1* | 8/2011 | Davis | G01R 29/0885 356/450 |
| 2011/0301886 A1 | 12/2011 | Iyama et al. | |
| 2012/0021707 A1 | 1/2012 | Forrester et al. | |
| 2013/0178240 A1 | 7/2013 | Kiyomoto | |
| 2014/0273819 A1* | 9/2014 | Nadakuduti | H04B 17/0032 455/41.1 |
| 2014/0274190 A1* | 9/2014 | Lu | H04W 52/367 455/522 |

OTHER PUBLICATIONS

International Search Report and Written Opinion—PCT/US2015/061168—ISA/EPO—dated Feb. 29, 2016.
Kanda, et al., "Faster Determination of Mass-Averaged SAR from 2-D Area Scans," IEEE Transactions on Microwave Theory and Techniques, vol. 52, No. 8, Aug. 2004, pp. 2013-2020.
447498 D01, "Mobile and Portable Devices RF Exposure Procedures and Equipment Authorization Policies", v05r02, Office of Engineering and Technology, Federal Communications Commission, 2014, pp. 1-32.
FCC KDB 648474 D01, "SAR evaluation considerations for handsets with multiple transmitters and antennas", v01r05, Office of Engineering and Technology, Federal Communications Commission, Sep. 2008, pp. 1-8.

* cited by examiner

DETERMINING TRANSMIT POWER LIMITS USING A COMBINED SPECIFIC ABSORPTION MEASUREMENT FOR MULTIPLE TRANSMITTERS

FIELD

The present disclosure relates generally to wireless communication systems, and more particularly to a method and apparatus for combining the radio frequency (RF) exposure, known as specific absorption rate (SAR), from multiple transmitters in a wireless device in a simultaneous transmission scenario to generate look-up tables containing maximum transmit power limits of one transmitter as a function of varying combinations of transmit power levels of other transmitters.

BACKGROUND

Wireless communication devices have become smaller and more powerful as well as more capable. Increasingly users rely on wireless communication devices for mobile phone use as well as email and Internet access. At the same time, devices have become smaller in size. In addition, devices may now incorporate multiple transmitters and antennas. These factors may increase a user's exposure to radio frequency (RF) radiation. Devices such as cellular telephones, personal digital assistants (PDAs), laptop computers, and other similar devices provide reliable service with expanded coverage areas. Such devices may be referred to as mobile stations, stations, access terminals, user terminals, subscriber units, user equipments, and similar terms.

A wireless communication system may support communication for multiple wireless communication devices at the same time. In use, a wireless communication device may communicate with one or more base stations by transmissions on the uplink and downlink. Base stations may be referred to as access points, Node Bs, or other similar terms. The uplink or reverse link refers to the communication link from the wireless communication device to the base station, while the downlink or forward link refers to the communication from the base station to the wireless communication devices.

Wireless communication systems may be multiple access systems capable of supporting communication with multiple users by sharing the available system resources, such as bandwidth and transmit power. Examples of such multiple access systems include code division multiple access (CDMA) systems, time division multiple access (TDMA) systems, frequency division multiple access (FDMA) systems, wideband code division multiple access (WCDMA) systems, global system for mobile (GSM) communication systems, enhanced data rates for GSM evolution (EDGE) systems, and orthogonal frequency division multiple access (OFDMA) systems.

Wireless devices, including mobile telephones are required to undergo testing to determine the amount of RF energy a user may be exposed to when using the device. In the U.S., the Federal Communications Commission (FCC) certifies mobile devices to ensure compatibility with requirements and user safety. This FCC certification requires time consuming spatial measurements, which are made by attaching devices to a phantom filled with tissue simulating liquid that simulates the response of a human body. The FCC requires evaluation of the peak (1 g volume) averaged SAR. This testing involves measuring the electric field in a three dimensional human head/body phantom volume filled with tissue simulating liquid.

Since it is time consuming to perform the three-dimensional scan over the entire region exposed to the radiation from the wireless device, the measuring time is reduced by a first measuring the electric field along the two-dimensional surface contour of the head/body phantom. This is known as an "area scan." The area scan is followed by a "volume scan" around the peak electric field (SAR) location, which was previously identified by the area scan. Typically the volume scan takes more time to measure, but provides more detail about the local SAR location. In the volume scan, averaging is performed over 1 g-volume of tissue to determine the peak 1 g-averaged SAR, which is used to demonstrate compliance with the SAR limits, as required by the regulatory body whose certification is sought.

The procedure described above is suitable for measuring SAR from wireless devices with only one transmitter. When multiple transmitters are present on a device and are simultaneously active, it is not practical to combine the SAR measurements from individual transmitters. This is because typically the peak SAR location determined from the area scan is at different locations for each of the multiple transmitters. As a result, there is no overlap in the smaller localized volume scans performed when evaluating peak 1 g-averaged SAR for the individual transmitters. Presently, the only alternative to overcoming this deficiency is to perform an over-sized volume scan that covers the entire region exposed to the wireless device. This approach is extremely time consuming Due to the lack of alternatives, device manufacturers are adding the peak 1 g-averaged SAR values from the individual transmitters to produce a combined SAR value for the device. This approach results in an overly conservative value for the device, which in turn, leads to significant back off in transmit power in order to gain certification. There is a need in the art for a method and apparatus to combine the SAR readings from multiple simultaneous transmitters.

SUMMARY

Embodiments contained in the disclosure provide a method for determining transmit power limits for multiple transmitter devices. The method begins when a two-dimensional area scan is performed for each transmitter. A localized three-dimensional volume scan is then performed for each transmitter. The two dimensional area scans are then converted to a three-dimensional volume scan. Once the scans have been converted to three-dimensional volume scans, a combined worst-case conversion error for the multiple transmitters is determined. This combined worst-case error is then used to determine the maximum transmit power for the multiple transmitters.

A further embodiment provides an apparatus for determining transmit power limits for multiple transmitters. The apparatus includes a wireless device having at least two transmitters and two antennas and also includes a processor and memory for determining transmit power limits.

A still further embodiment provides an apparatus for determining transmit power limits for multiple transmitters. The apparatus includes means for performing a two-dimensional area scan for each transmitter; means for converting each two-dimensional area scan into a three-dimensional volume scan; means for determining an error for each converted scan; and means for determining a combined worst-case error for the multiple transmitters.

DETAILED DESCRIPTION

Figure 1:
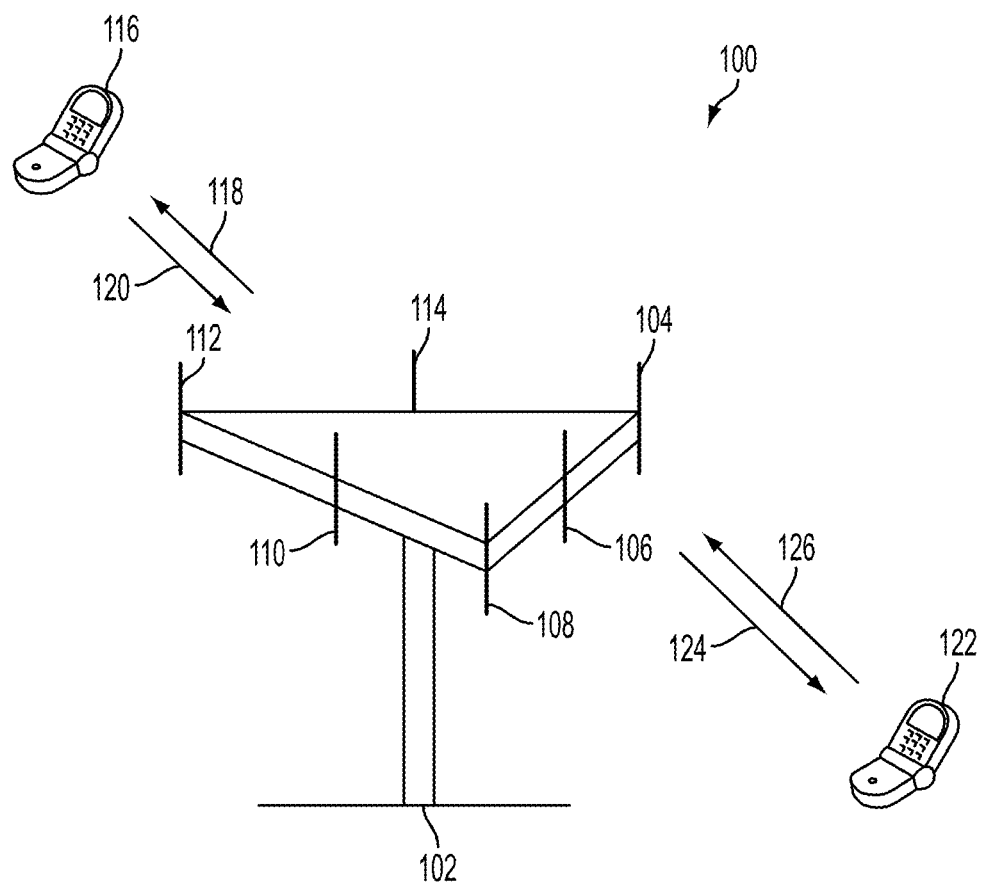
FIG. 1 illustrates a wireless multiple-access communication system, in accordance with certain embodiments of the disclosure.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

As used in this application, the terms "component," "module," "system," and the like are intended to refer to a computer-related entity, either hardware, firmware, a combination of hardware and software, software, or software in execution. For example, a component may be, but is not limited to being, a process running on a processor, an integrated circuit, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network, such as the Internet, with other systems by way of the signal).

Furthermore, various aspects are described herein in connection with an access terminal and/or an access point. An access terminal may refer to a device providing voice and/or data connectivity to a user. An access wireless terminal may be connected to a computing device such as a laptop computer or desktop computer, or it may be a self-contained device such as a cellular telephone. An access terminal can also be called a system, a subscriber unit, a subscriber station, mobile station, mobile, remote station, remote terminal, a wireless access point, wireless terminal, user terminal, user agent, user device, or user equipment. A wireless terminal may be a subscriber station, wireless device, cellular telephone, PCS telephone, cordless telephone, a Session Initiation Protocol (SIP) phone, a wireless local loop (WLL) station, a personal digital assistant (PDA), a hand-held device having wireless connection capability, or other processing device connected to a wireless modem. An access point, otherwise referred to as a base station or base station controller (BSC), may refer to a device in an access network that communicates over the air-interface, through one or more sectors, with wireless terminals. The access point may act as a router between the wireless terminal and the rest of the access network, which may include an Internet Protocol (IP) network, by converting received air-interface frames to IP packets. The access point also coordinates management of attributes for the air interface.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ), and integrated circuits such as read-only memories, programmable read-only memories, and electrically erasable programmable read-only memories.

Various aspects will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Other aspects, as well as features and advantages of various aspects, of the present invention will become apparent to those of skill in the art through consideration of the ensuring description, the accompanying drawings and the appended claims.

FIG. 1 illustrates a multiple access wireless communication system 100 according to one aspect. An access point 102 (AP) includes multiple antenna groups, one including 104 and 106, another including 108 and 110, and an additional one including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over downlink or forward link 118 and receive information from access terminal 116 over uplink or reverse link 120. Access terminal 122 is in communication with antennas 106 and 108, where antennas 106 and 108 transmit information to access terminal 122 over downlink or forward link 124, and receive information from access terminal 122 over uplink or reverse link 126. Access terminal 122 may have multiple transmitters and antennas to provide improved service. In a frequency division duplex (FDD) system, communication link 118, 120, 124, and 126 may use a different frequency for communication. For example, downlink or forward link 118 may use a different frequency than that used by uplink or reverse link 120.

Each group of antennas and/or the area in which they are designed to communicate is often referred to as a sector of the access point. In an aspect, antenna groups are each designed to communicate to access terminals in a sector of the areas covered by access point 102.

In communication over downlinks or forward links 118 and 124, the transmitting antennas of an access point utilize beamforming in order to improve the signal-to-noise ration (SNR) of downlinks or forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as a Node B, an evolved Node B (eNB), or some other terminology. An access terminal may also be called a mobile station, user equipment (UE), a wireless communication device, terminal or some other terminology. For certain aspects, either the AP 102, or the access terminals 116, 122 may utilize the techniques described below to improve performance of the system.

Figure 2:
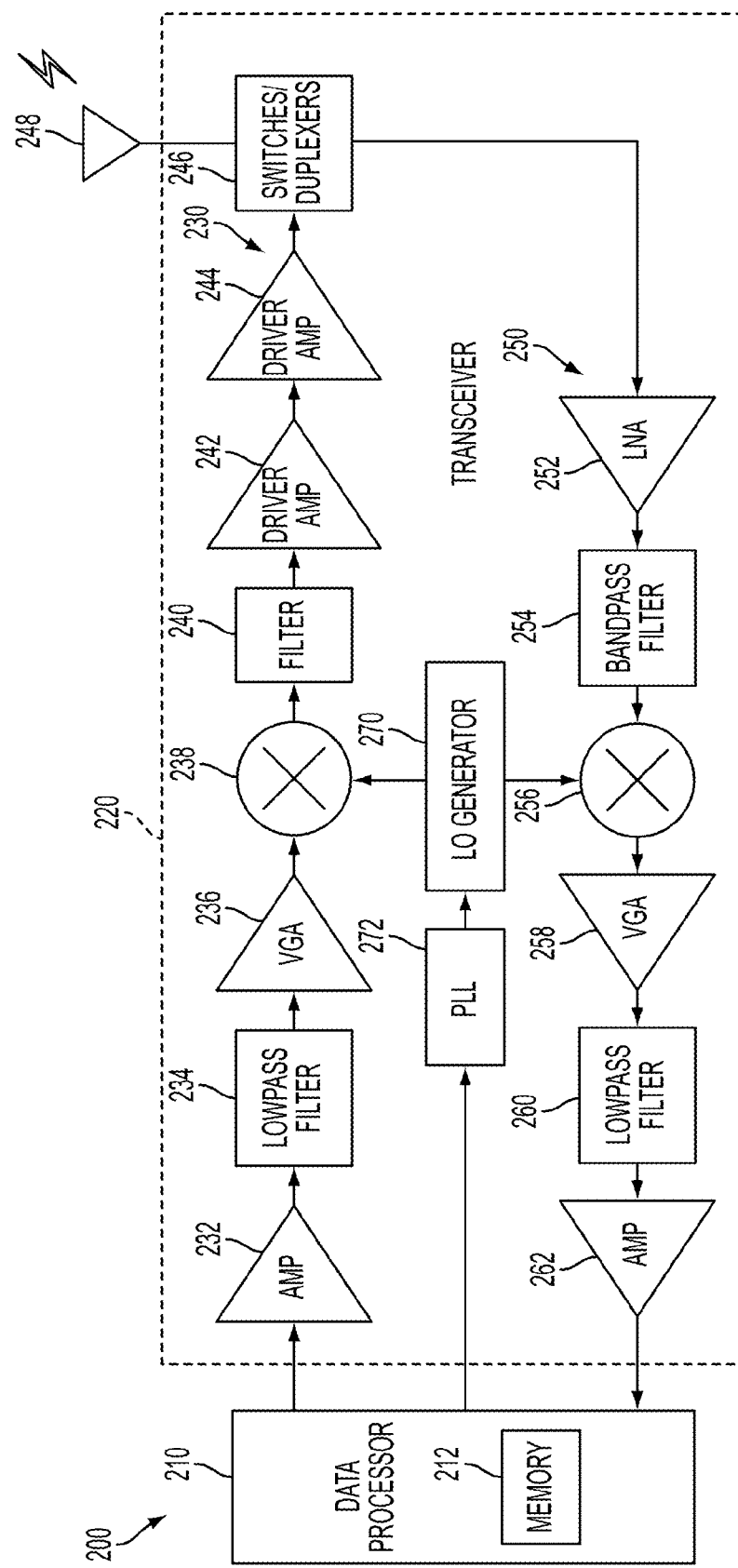
FIG. 2 is a block diagram of a wireless communication system in accordance with embodiments of the disclosure.

FIG. 2 shows a block diagram of an exemplary design of a wireless communication device 200. In this exemplary design, wireless device 200 includes a data processor 210 and a transceiver 220. Transceiver 220 includes a transmitter 230 and a receiver 250 that support bi-directional wireless communication. In general, wireless device 200 may include any number of transmitters and any number of receivers for any number of communication systems and any number of frequency bands. Each transmitter and antenna on a wireless communication device 200 emits RF radiation.

In the transmit path, data processor 210 processes data to be transmitted and provides an analog output signal to transmitter 230. Within transmitter 230, the analog output signal is amplified by an amplifier (Amp) 232, filtered by a lowpass filter 234 to remove images caused by digital-to-analog conversion, amplified by a VGA 236, and upconverted from baseband to RF by a mixer 238. The upconverted signal is filtered by a filter 240, further amplified by a driver amplifier, 242 and a power amplifier 244, routed through switches/duplexers 246, and transmitted via an antenna 249.

In the receive path, antenna 248 receives signals from base stations and/or other transmitter stations and provides a received signal, which is routed through switches/duplexers 246 and provided to receiver 250. Within receiver 250, the received signal is amplified by an LNA 252, filtered by a bandpass filter 254, and downconverted from RF to baseband by a mixer 256. The downconverted signal is amplified by a VGA 258, filtered by a lowpass filter 260, and amplified by an amplifier 262 to obtain an analog input signal, which is provided to data processor 210.

FIG. 2 shows transmitter 230 and receiver 250 implementing a direct-conversion architecture, which frequency converts a signal between RF and baseband in one stage. Transmitter 230 and/or receiver 250 may also implement a super-heterodyne architecture, which frequency converts a signal between RF and baseband in multiple stages. A local oscillator (LO) generator 270 generates and provides transmit and receive LO signals to mixers 238 and 256, respectively. A phase locked loop (PLL) 272 receives control information from data processor 210 and provides control signals to LO generator 270 to generate the transmit and receive LO signals at the proper frequencies.

FIG. 2 shows an exemplary transceiver design and wireless device 200 may contain multiple transceivers. In general, the conditioning of the signals in transmitter 230 and receiver 250 may be performed by one or more stages of amplifier, filter, mixer, etc. These circuits may be arranged differently from the configuration shown in FIG. 2. Some circuits in FIG. 2 may also be omitted. All or a portion of transceiver 220 may be implemented on one or more analog integrated circuits (ICs), RF ICs (RFICs), mixed-signal ICs, etc. For example, amplifier 232 through power amplifier 244 in transmitter 230 may also be implemented on an RFIC. Driver amplifier 242 and power amplifier 244 may also be implemented on another IC external to the RFIC.

Data processor 210 may perform various functions for wireless device 200, e.g., processing for transmitter and received data. Memory 212 may store program codes and data for data processor 210. Data processor 210 may be implemented on one or more application specific integrated circuits (ASICs) and/or other ICs.

Wireless devices, such as mobile phones used in the network described above in FIG. 1 generate transmit power that, at high levels, may harm users. This transmit power is used to access the network and is generated by the transmit chain described in FIG. 2. Wireless devices are certified by various regulatory bodies world-wide for safety and transmit power may be reduced in order to ensure users' safety.

SAR is a measure of the rate at which energy is absorbed by the human body when exposed to an RF electromagnetic field. SAR is defined as the power absorbed per mass of tissue, and has units of watts per kilogram (W/Kg). SAR may be averaged over the entire body, however, it may also be averaged over a smaller sample volume (typically 1 g or 10 g of tissue). The resulting value cited is the maximum level measured in the body part studied over the stated volume or mass. For wireless devices, the body part is usually the head, although measurements may be made over a torso.

The SAR for electromagnetic energy may be calculated from the electric field within the tissue as:

$$SAR = \int_{sample} \frac{\sigma(r)|E(r)|^2}{\rho(r)} dr$$

where $\sigma$ is the sample electrical conductivity
E is the root mean square (RMS) electric field
$\rho$ is the sample density
r covers the sample region of the body SAR measures exposure to RF fields between 100 kHz and 10 GHz (generally known as radio waves). It is commonly used to measure the power absorbed by mobile phones and during magnetic resonance imaging (MRI) scans. The SAR value is significantly dependent on the geometry of the body part exposed to the RF energy, and also on the exact location and geometry of the RF source. As a result, each mobile device model must be tested with each specific source at the intended use position.

When measuring the SAR of a wireless device the device is placed at the head in a talk position, or may be placed flat against the body phantom. The SAR value is then measured at the location with the highest absorption rate. Typically, for a wireless device, the highest values are generated near the antenna. SAR values depend heavily on the size of the averaging volume.

Figure 3:
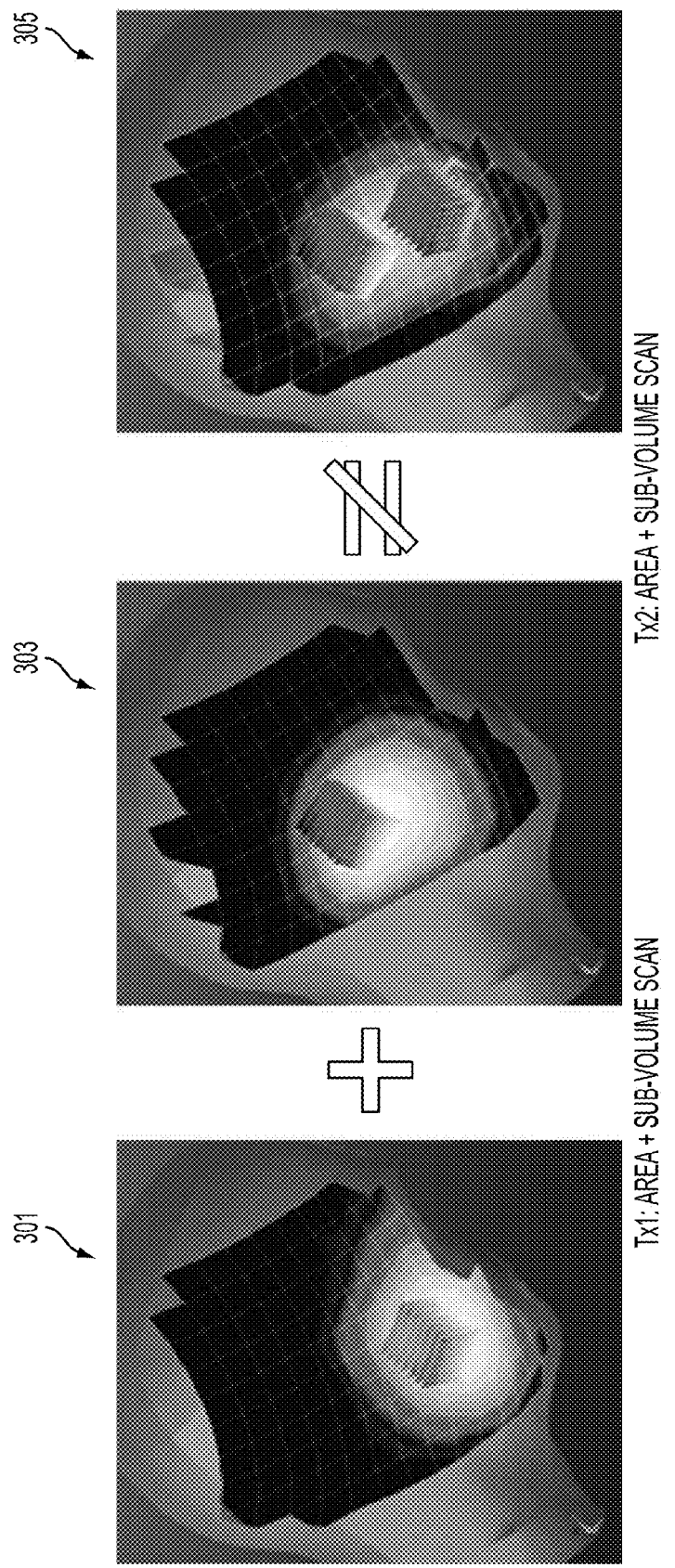
FIG. 3 illustrates the difficulties of existing methods in measuring SAR.

FIG. 3 illustrates the problems with existing methods of determining SAR values for devices with multiple transmitters. In block 301 a first transmitter T1 is tested. The active transmitter is shown superimposed on a head outline filled with a tissue simulating liquid. The measured sub-volume scan region for T1 is shown around the peak location of the measured area scan. This sub-volume is the peak area affected by T1. A second transmitter T2 is also a part of the wireless device being tested. T2 affects an area nearby, but close to the area affected by T1. For both areas affected individual sub-volume scans determine the volume-averaged SARs required for compliance with emission certification requirements for each transmitter.

However, the sub-volume scans are not overlapping for both transmitters, and in the case of simultaneous transmission, they are not sufficient to determine the combined SAR values, and as a result the maximum allowable transmitter power for simultaneous transmission. Full-volume scans covering the entire area, (or peak areas of both transmitters) are needed in order to combine the SAR from T1 and T2. These full-volume scans are extremely time consuming to perform and most wireless device manufacturers opt for another solution. In most cases manufacturers opt to directly add the peak SAR values of each transmitter. This forces manufacturers to place significant reductions on maximum transmit powers in case of simultaneous transmissions, in order to simplify the compliance testing process. This back-off of transmit powers may result in reduced coverage, as well as lower voice quality and data transmission throughput in areas of poor coverage. The end result may also be user dissatisfaction with the wireless device.

Embodiments described in this disclosure provide a method that overcomes the difficulties described above. The method first performs a two-dimensional area scan for each transmitter and antenna in the wireless device. These two-dimensional SAR area scans are then converted to a three-dimensional volume scan by empirically estimating the SAR in the third direction (that is, along phantom depth). An alternative embodiment provides for using SAR measurement data along phantom depth measured as part of a smaller volume scan. These methods alone are not sufficient, as current regulatory body testing requirements do not accept them alone as accurate. For individual transmitters and antennas, the peak SAR may be estimated from both measurements and analytical approaches, as the smaller volume scan allows the error to be quantified. Quantifying the error may be done using an analytical approach for a given transmitter or antenna. The worst-case conversion error may be determined for all individual transmitters that are simultaneously active in the multiple transmitter combination undergoing testing. Analytically extracted three-dimensional SAR data from each transmitter may then be combined to determine the total three-dimensional SAR data, and subsequently, the peak total SAR value for the simultaneously active multiple transmitter combination. The worst-case conversion error may then be added to this peak total SAR value to account for the error associated with the analytical approach, and may also be used to obtain a conservative SAR assessment. The embodiments described in this disclosure provide numerous advantages: accounting for worst-case errors in the analytical approach; providing a conservative assessment of total SAR; and results in less power back-off in maximum transmit power for multiple transmitter devices.

The analytically extracted three-dimensional volume data for each transmitter may be further post-processed in real time by the wireless device. In this post-processing 1 g-averaged SAR data over a two dimensional area scan may be stored within a memory in the wireless device along with the associated worst-case conversion errors. This permits the internal processor of the wireless device to compute the total SAR and determine the power back-off needed to meet SAR compliance requirements.

Figure 4:
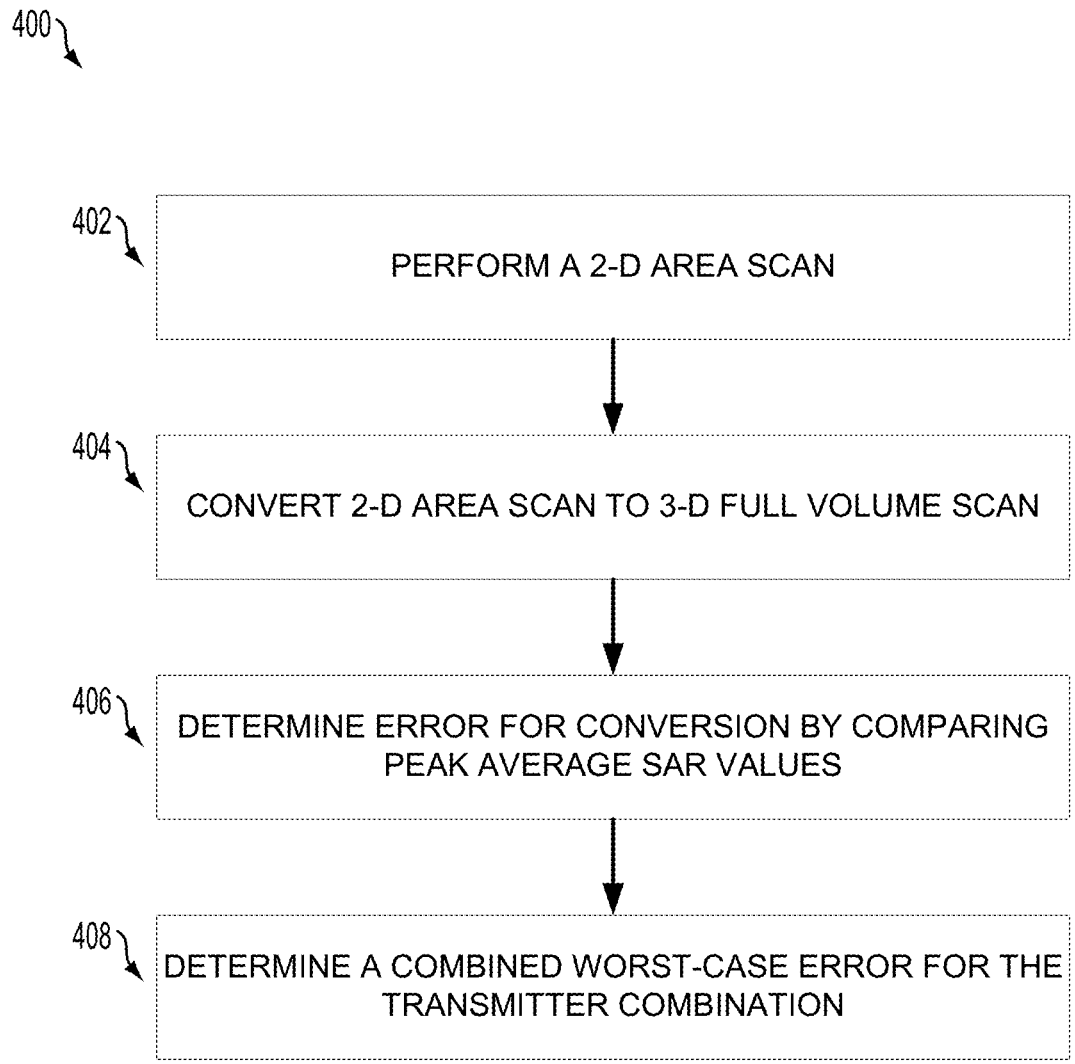
FIG. 4 is a flow diagram of a method of converting a two-dimensional area scan into a full-volume three dimensional scan according to embodiments described herein.

FIG. 4 is a flow diagram of a process for converting a two-dimensional area scan to a full-volume three dimensional scan according to an embodiment. The method, 400, begins when a two-dimensional area scan is performed in step 402. This area scan is performed as described above, with a phantom exposed to an operating transmitter and collecting SAR measurements. In step 404 the area scan is converted to a full-volume scan using an empirical estimation. In this step the analytically determined three dimensional volume data for all transmitters are combined using an analytical estimation. The empirical estimation may be performed using techniques similar to those described in "Kanda et al., "Faster Determination of Mass-Averaged SAR from 2-D area scans" published in IEEE Trans. Microwave Theory Techniques, 52(8): 2013-2020, 2004. The empirical estimation may also be performed using SAR data measured along the phantom depth as part of the sub-volume scan. In this case, the technique described in Marckel et al., "Parametric model approach for rapid SAR measurements", IMTC2004, Instrumentation and Measurement Tech. Conference, pp. 178-183, Como, Italy, May 2004, may be used. Any other suitable estimation method may also be used. The error associated with the two-dimensional to three-dimensional conversion for each transmitter may be determined by comparing the peak averaged SAR value determined from the analytical estimation with the value determined from the measured sub-volume scan in step 406. Then, in step 408 a combined worst-case error is then determined for the combination of transmitters simultaneously transmitting.

Figure 5:
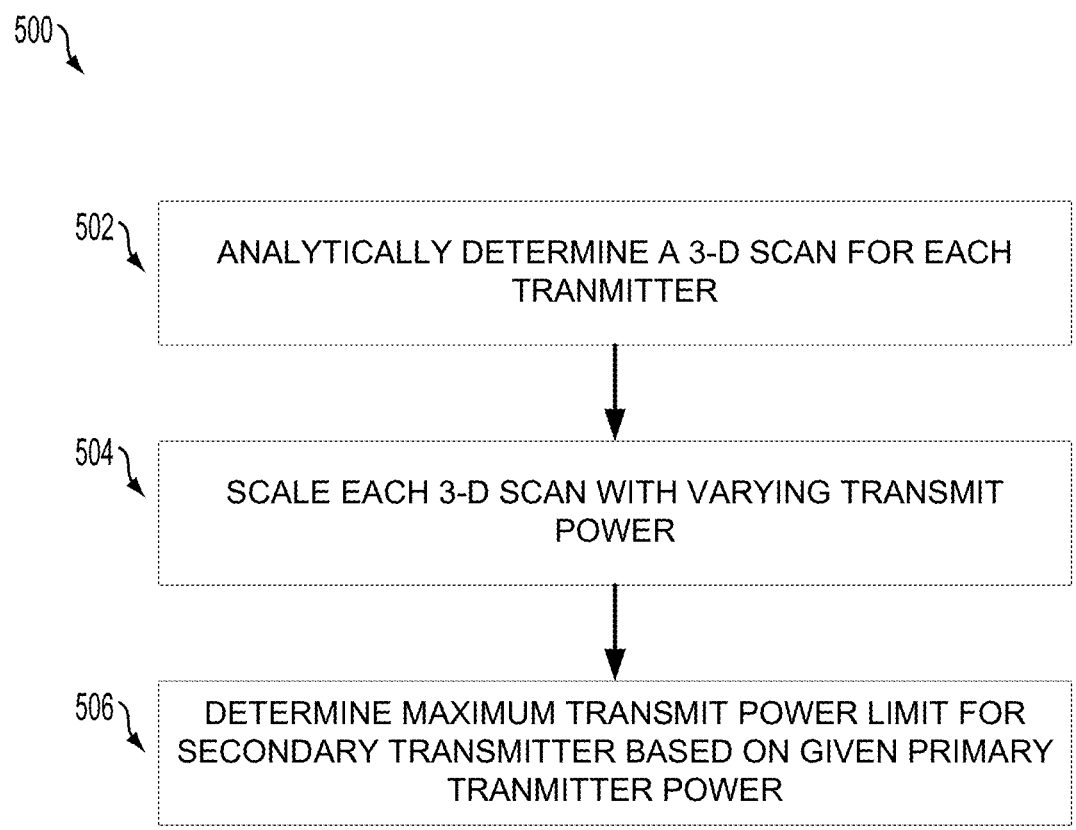
FIG. 5 is a flow diagram of a method of combining SAR for simultaneous transmissions to determine transmit power limits, according to an embodiment described herein.

FIG. 5 is a flow diagram of the method of combining the analytically determined three-dimensional scans for both transmitters to determine a combined peak 1 g/10 g averaged SAR. The method 500 begins in step 502 when a three-dimensional scan is analytically determined for each of the transmitters in the wireless device. Next, in step 504, each three dimensional scan is scaled with varying transmit power levels. Then in step 506, the maximum transmit power limit for the secondary transmitter is determined. This transmit power limit is determined for the secondary transmitter based on a given primary antenna transmitter power(s). This determination is based on the following equation:

Combined peak 1 g/10 g averaged SAR*[1+(worst-case 2D-to-3D conversion error]≤SAR limit.

In an alternative embodiment, averaging may be performed on the three-dimensional scans to determine the peak two-dimensional 1 g/10 g averaged SAR distributions for each transmitter. This reduces the number of computations before scaling and combining to determine the combined peak 1 g/10 g averaged SAR.

Figure 6:
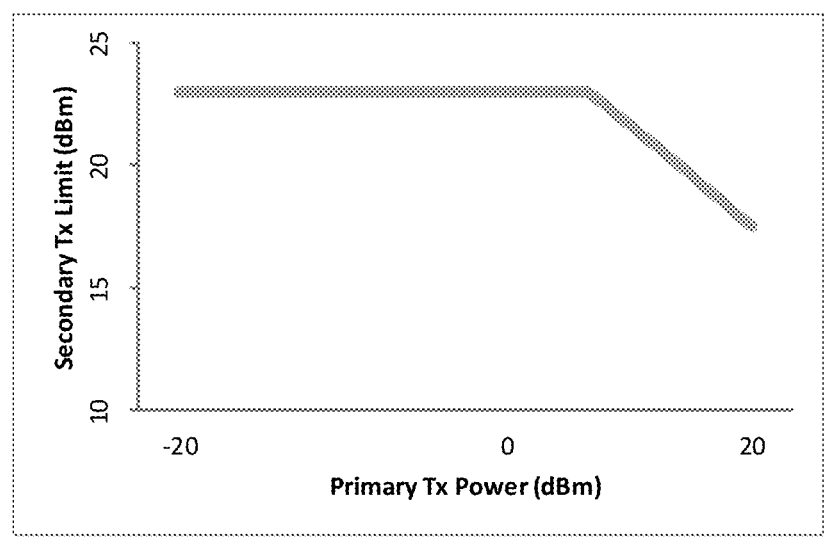
FIG. 6 is a look-up curve for determining transmit power limits for a combination of transmitters, according to embodiments described herein.

FIG. 6 illustrates a look-up curve for determining the appropriate transmit power for a combination of transmitters. Transmit power limits may be given in discrete steps of transmit power using a look-up table or a look-up curve, such as that shown in FIG. 6, may be generated for a given combination of transmitters. The look-up curve or table may be generated based on priorities determined for each transmitter and antenna combination. In this embodiment, the look-up table or curve is generated and stored in the mobile device.

In a further embodiment the look-up table or curve may be generated on the mobile device in real-time by storing two-dimensional 1 g/10 g SAR distributions along with the associated conversion errors. The transmit power of the primary transmitter is monitored in the modem with the transmit powers of successive transmitters ($2^{nd}$, $3^{rd}$, etc.), limited in real-time.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitter over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM EEPROM, CD-ROM or other optical disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A method of determining transmit power limits for multiple transmitters, comprising:
performing a two-dimensional area specific absorption rate (SAR) scan for each transmitter;
performing a localized three-dimensional volume SAR scan for each transmitter;
converting each two-dimensional area SAR scan into a three-dimensional volume SAR scan;
determining an error for each converted SAR scan;
combining the localized three-dimensional volume SAR scans from each transmitter to produce a total SAR value for the multiple transmitters;
determining a combined worst-case SAR value error for the multiple transmitters; and
determining transmit power limits for the multiple transmitters using the combined worst-case SAR value error.

2. The method of claim 1, wherein the area SAR scan is a scan of a phantom.

3. The method of claim 1, wherein the error for each conversion is determined by comparing peak specific absorption ratio (SAR) values for each transmitter.

4. The method of claim 1, wherein the converting each two-dimensional area SAR scan into a three-dimensional volume SAR scan uses an analytical technique.

5. The method of claim 1, wherein three-dimensional volume SAR scans are averaged to produce an average two-dimensional specific absorption rate (SAR) distribution for each transmitter.

6. The method of claim 5, further comprising:
scaling each three-dimensional SAR scan with a varying transmit power; scaling an average two-dimensional specific absorption rate (SAR) with varying transmit power; and
determining a maximum transmit power limit for a secondary antenna based on a given primary antenna.

7. The method of claim 6, wherein determining the maximum transmit power is based on a combined specific absorption ratio (SAR).

8. The method of claim 7, wherein the combined SAR value is scaled by a worst-case two-dimensional area SAR scan to a three-dimensional volume data conversion error.

9. The method of claim 7, wherein the combined SAR is determined by averaging on three-dimensional volume SAR scans to determine a peak two-dimensional averaged SAR distribution.

10. The method of claim 6, wherein determining a maximum transmit power is based on a look-up table.

11. The method of claim 6, wherein determining a maximum transmit power is based on a look-up curve.

12. The method of claim 10, wherein the look-up table is generated on a wireless device.

13. The method of claim 11, wherein the look-up curve is generated on a wireless device.

14. An apparatus for determining transmit limits for multiple transmitters, comprising:
    a wireless device having at least two transmitters and at least one antenna; and
    a processor for determining transmit power limits, using specific absorption rate (SAR) values, wherein the processor is configured to determine transmit power limits using a combined worst-case SAR value error and further wherein the combined worst-case SAR value error is based on a combined three-dimensional volume SAR scan from localized three-dimensional SAR volume scans from each of the at least two transmitters that are converted from two-dimensional SAR area scans for each of the at least two transmitters.

15. The apparatus of claim 14, wherein the processor determining transmit power limits generates a look-up table or look-up curve in real time by monitoring transmit power of a primary antenna in a modem.

16. An apparatus for determining transmit power limits for multiple transmitters, comprising:
    means for performing a two-dimensional area specific absorption rate (SAR) scan for each transmitter;
    means for converting each two-dimensional area SAR scan into a three dimensional volume SAR scan;
    means for determining an error for each converted SAR scan;
    means for combining the localized three-dimensional volume SAR scans from each transmitter to produce a total SAR value for the multiple transmitters;
    means for determining a combined worst-case SAR value error for the multiple transmitters; and
    means for determining transmit power limits for the multiple transmitters using the combined worst-case SAR value error.

17. The apparatus of claim 16, wherein the means for determining an error for each converted SAR scan includes means for comparing peak specific absorption ratio (SAR) values for each transmitter.

18. The apparatus of claim 16, wherein the apparatus for determining transmit power limits further comprises:
    means for scaling each three-dimensional volume SAR scan with a varying transmit SAR scan; and
    means for determining a maximum transmit power limit for a secondary antenna based on a given primary antenna.

19. The apparatus of claim 18, further comprising:
    means for computing a combined specific absorption ratio (SAR) by scaling a difference between a SAR limit to a three-dimensional volume data conversion.

* * * * *